(No Model.) 2 Sheets—Sheet 1.
H. STRAUSS.
BATH TUB ATTACHMENT.
No. 604,803. Patented May 31, 1898.
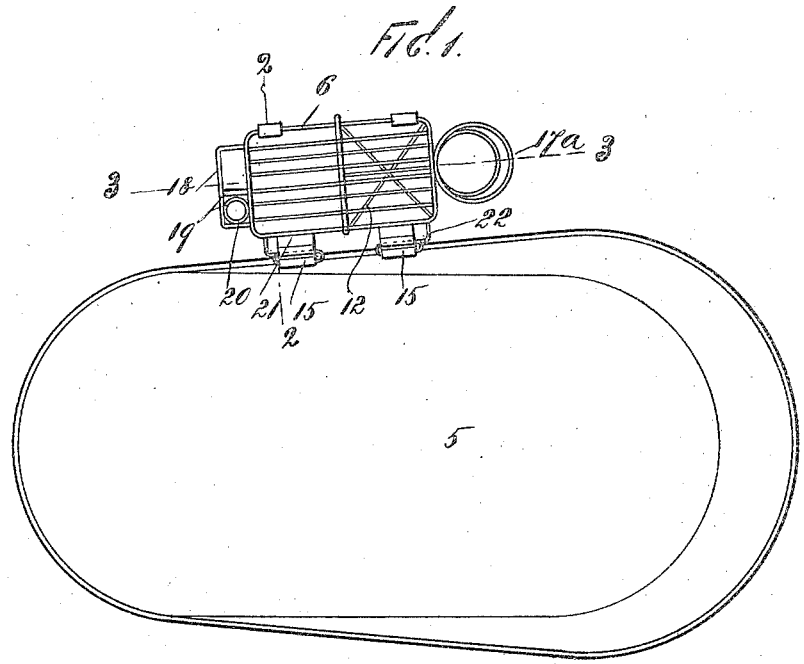
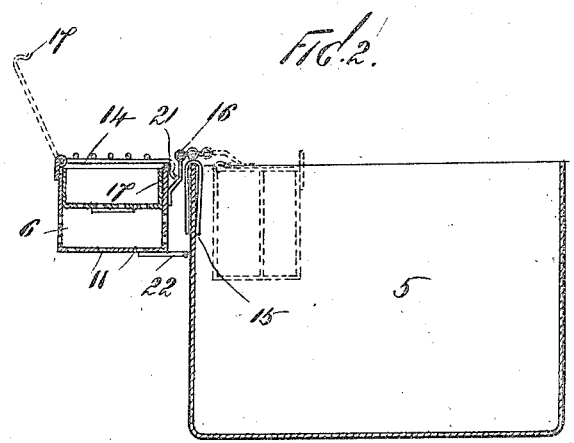
WITNESS
John Buckler
L. W. Muller
INVENTOR
Henry Strauss
BY
Edgar Tate & Co
ATTORNEYS (No Model.) 2 Sheets—Sheet 2.
H. STRAUSS.
BATH TUB ATTACHMENT.
No. 604,803. Patented May 31, 1898.
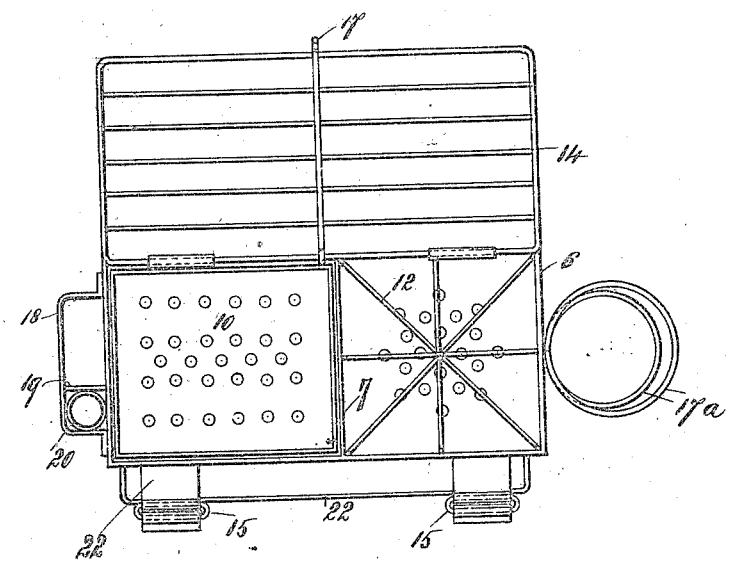
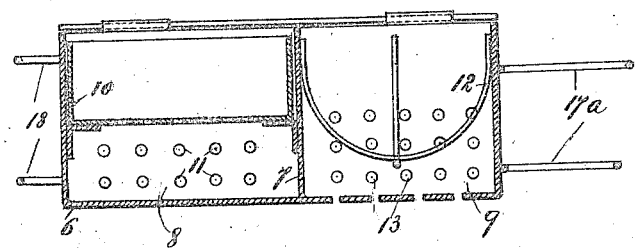
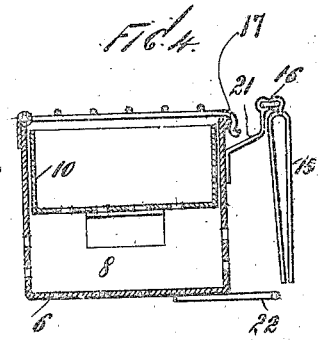
WITNESSES:
G. P. Van Wye
C. Gerst
INVENTOR
Henry Strauss
BY
Edgar _____
ATTORNEYS.

UNITED STATES PATENT OFFICE.

HENRY STRAUSS, OF NEW YORK, N. Y.

BATH-TUB ATTACHMENT.

SPECIFICATION forming part of Letters Patent No. 604,803, dated May 31, 1898.

Application filed July 15, 1897. Serial No. 644,721. (No model.)

*To all whom it may concern:*

Be it known that I, HENRY STRAUSS, a citizen of the United States, residing at New York, in the county of New York and State of New York, have invented certain new and useful Improvements in Bath-Tub Attachments, of which the following is a full and complete specification, such as will enable those skilled in the art to which it appertains to make and use the same.

This invention relates to bath-tub attachments for holding soap, brushes, and combs, a sponge, and other articles of this class; and the object thereof is to provide an improved device of this class which is adapted to be connected with the side of the bath-tub and to be removed therefrom when desired.

The invention is fully disclosed in the following specification, of which the accompanying drawings form a part, in which—

Figure 1 is a plan view of a bath-tub provided with my improved attachment; Fig. 2, a section on the line 2 2 of Fig. 1; Fig. 3, a section on the line 3 3 of Fig. 1; Fig. 4, a section on the line 2 2 of Fig. 1 on an enlarged scale, and Fig. 5 a plan view of my attachment on an enlarged scale.

In the drawings forming part of this specification the like parts of my improvement are designated by the same numerals of reference in each of the views, and in said drawings I have shown at 5 a bath-tub which may be of any desired form or construction, and in the practice of my invention I provide an attachment 6 for the purpose herein specified, which is preferably composed of sheet metal.

The attachment 6 is oblong in form and is divided by a transverse partition 7 into two separate compartments 8 and 9, and the compartment 8 is provided with a detachable receptacle 10, which is preferably composed of finely-perforated metal and which is adapted to receive a cake of soap, and that portion of the compartment 8 below the detachable receptacle 10, or the side walls thereof, is preferably perforated, as shown at 11. The compartment 9 is provided with a basket-shaped receiver 12, adapted to receive a sponge, which is preferably composed of wire, and the side walls of said compartment, below said receiver and the bottom thereof, are also preferably perforated, as shown at 13. The attachment 6 is also provided with a hinged cover 14, and secured to the side thereof opposite said hinged cover are spring-clamps 15, which are adapted to engage with or clamp the side of the tub, and the attachment 6 is hinged to said clamp, as shown at 16, by means of straps 21, which are connected with said attachment, and said attachment is adapted to be folded inwardly into the tub, as shown in dotted lines in Fig. 2, when not in use, and the hinged cover 14 is provided with a spring-catch 17, by which it is held in the closed position, and when the bath-tub is in use the attachment is folded outwardly, as shown in full lines in Figs. 1 and 2.

The attachment 6 is provided at one end with wire loops or rings 17ᵃ, arranged one above the other, the lower loop being smaller than the upper one, and these loops or rings are intended to hold a glass, and the opposite end of the attachment is provided with a wire frame 18, which is divided transversely by a wire or wires 19 into two separate compartments or receivers, and in one of said compartments or receivers is placed a ring 20, and said frame or holder is adapted to hold a brush and a comb, which are inserted thereinto.

The attachment 6 may be made entirely of wire, if desired, and the bottom thereof on the side opposite the hinged connection of the cover 14 is provided with a wire or rod 22, which when the attachment is in the position shown in full lines in Fig. 2 strikes against the side of the tub and holds said attachment in a horizontal position.

My improvement is well adapted to accomplish the result for which it is intended, and it will be apparent that changes in and modifications of the construction herein described may be made without departing from the spirit of my invention or sacrificing its advantages.

Having fully described my invention, I claim as new and desire to secure by Letters Patent—

1. An attachment for bath-tubs, consisting of an oblong casing or receptacle which is divided by a transverse partition into two compartments, one of which is adapted to receive soap, and the other a sponge, said attachment being provided at its opposite ends with holders or receivers for a glass, and for a brush and comb, and said attachment being also provided with a hinged cover and with spring-clamps by which it may be connected with the bath-tub, substantially as shown and described.

2. The herein-described attachment for bath-tubs, said attachment being oblong in form and open at the top, and provided with a hinged cover, and at the opposite ends thereof with holders or receivers for a glass and brushes and other toilet articles, and said attachment being also divided transversely into two separate compartments, substantially as shown and described.

3. An attachment for bath-tubs, which is open at the top and oblong in form, and provided with a transverse partition, into two compartments, one of said compartments being provided with a detachable perforated receptacle, and the other with an open receiver, and the walls of said attachment below said detachable receptacle and said receiver being perforated, substantially as shown and described.

4. An attachment for bath-tubs, which is open at the top and oblong in form, and provided with a transverse partition, into two compartments, one of said compartments being provided with a detachable perforated receptacle, and the other with an open receiver, and the walls of said attachment below said detachable receptacle and said receiver being perforated, said attachment being also provided with hinged clamps by means of which it may be connected with the bath-tub, substantially as shown and described.

In testimony that I claim the foregoing as my invention I have signed my name, in presence of the subscribing witnesses, this 6th day of July, 1897.

HENRY STRAUSS.

Witnesses:
SELIGMAN HEYMANN,
MARK E. HARRIS.